April 28, 1925.

H. P. CHANDLER 1,535,984

CURRENT COLLECTING DEVICE

Filed April 9, 1924

Witness:
H. J. Stromberger.

Inventor
Homer P. Chandler.
By
Attorney

Patented Apr. 28, 1925.

1,535,984

UNITED STATES PATENT OFFICE.

HOMER P. CHANDLER, OF MANSFIELD, OHIO, ASSIGNOR TO THE OHIO BRASS COMPANY, OF MANSFIELD, OHIO, A CORPORATION OF NEW JERSEY.

CURRENT-COLLECTING DEVICE.

Application filed April 9, 1924. Serial No. 705,215.

*To all whom it may concern:*

Be it known that I, HOMER P. CHANDLER, a citizen of the United States of America, residing at Mansfield, in the county of Richland and State of Ohio, have invented certain new and useful Improvements in a Current-Collecting Device, of which the following is a specification.

My invention relates to current collecting devices for use with moving vehicles operated electrically and has particular reference to the collecting element which moves relatively to the current supply conductor and which I term the current collecting shoe.

In devices of this character now on the market, while some of them are of the sliding contact type, the majority of them are of the rotatable or wheel type, but I have found that the sliding type has material advantages over the rolling or wheel type, in that, it offers a substantial area of contact with the trolley wire or conductor in place of practically a line contact as in the wheel type of collector. This permits the collection of a larger amount of current from the trolley conductor with greater efficiency as the current transmitted per unit area contact between the collector and the conductor will be much less with the sliding type than with the wheel type thereby reducing sparking and heating materially.

At the same time, with a properly constructed sliding collector the same has less tendency to leave the conductor under abnormal conditions than is the case with the wheel type.

I have found also that the wear upon the sliding type of collector is much less than upon the rolling type for the reason that the pressure per unit area is less in the sliding collector than in the wheel collector. This is also an important factor in connection with the trolley conductor which will naturally be worn at a less rapid rate with the sliding collector than with the wheel collector.

I also find that a properly constructed sliding collector is more flexible as to its contact relation with the conductor than the wheel type. There is no relative movement of the wheel collector with respect to the conductor other than a rolling movement as the vehicle moves forward or backward and the contact is substantially a line contact, therefore, when the collector strikes a supporting device used in suspending the conductor with sufficient force to cause the collector to rebound, the only condition that can take place with the wheel collector is a separation of the same from the trolley conductor, but in case of the sliding collector if the same is properly mounted, it may still strike a supporting device for the conductor and have that portion which strikes the supporting device rebound without the entire collector leaving the conductor. This construction I bring about by properly pivoting my invention so that the forward end thereof which engages the conductor may leave the conductor when it meets an overhead obstruction without the trailing end breaking contact with the conductor. The forward contacting portion of my invention is always in a yielding relation to the conductor when the vehicle is moving forward or backward.

I find that it is possible to construct my improved collecting shoe with a plurality of flat conductor contacting faces so that different faces may be pressed to the conductor from time to time and also different faces pressed, depending on whether the vehicle is moving forward or backward. This construction, I find, permits the greatest wearing efficiency as the number of contact faces is a maximum with a minimum amount of material.

I find that if the device is made to resemble a wheel collector as much as possible, that there is less tendency for my sliding collector to become entangled with the overhead construction if, by any chance, it should leave the conductor, and I further find that the wear upon the supporting pin is very much less than in the rolling type as there is practically a small amount of movement of the collecting shoe relative to its supporting pin. Other advantages of the sliding shoe in general and particularly of my own invention herein disclosed, as compared with the wheel type and other types of collecting shoes, will be readily understood by those skilled in the art.

In the drawing accompanying this specification:

Fig. 1 is a side elevation of my invention.
Fig. 2 is an edge view of Fig. 1.
Fig. 3 is a sectional view on the line 3—3 of Fig. 1.

In the preferred embodiment of my invention I prefer to employ a body member 1 provided with circular flanges 2—2 spaced apart and forming the groove 3 therebetween and having an irregular periphery composed of a plurality of portions to engage the trolley conductor. These portions of the periphery may be designated as the contact portions A, B and C and the circular connecting portions $x$, $y$ and $z$. In the construction disclosed herein, I employ three contact portions and three connecting portions alternately disposed. Extensions of the contact portions A, B and C would meet if extended, forming a triangle.

Figure 4:
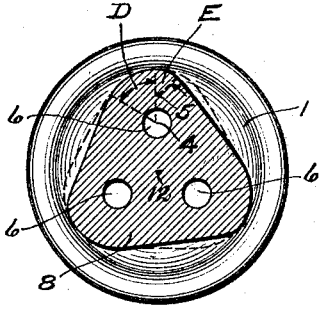
Fig. 4 is a sectional view on the line 4—4 of Fig. 2.

The ends of the contact portions A, B and C are connected by a curved surface $x$, $y$ or $z$, as shown. These curved surfaces are formed preferably of two different arcs having different radii, as, for instance, the arcs D and E. The center of the radius of the arc D I have shown as at 4, while the center of the radius for the arc E, I have shown as at 5. This construction has the advantage of increasing somewhat the length of the portions A, B and C which engage with the conductor, as shown in Fig. 4. If the entire surface $x$, $y$ and $z$ was formed with a single radius, as, for instance, the long radius having its center at 4 then the construction of the elements A, B and C and $x$, $y$ and $z$ would be as shown by the dotted line in Fig. 4. The preferred construction described also permits a slightly greater depth of groove at one end of the straight portion A, B or C and this may under some circumstances be found an advantage to prevent the collector leaving the trolley conductor under severe conditions of operation. This greater depth of the groove at one end of the portions A, B or C may be placed at the advance or the trailing end of the portion A, B or C, as desired, by proper positioning of the collecting device in the supporting harp.

I have not shown any supporting harp as no special harp is required with my invention, as it can be made, and is intended to be made, so as to fit any of the standard and numerous harps now found on the market. In other words, my invention can be substituted for any of the rolling contacts now found in use by so proportioning the parts of my invention that the external dimensions will permit their fitting the harp in question.

Figure 1:
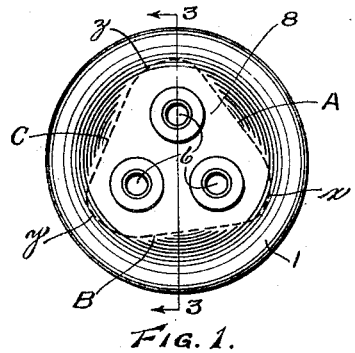
Figure 2:
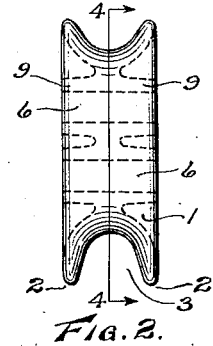
Figure 3:
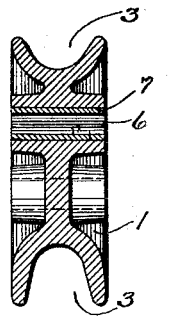
Figures 5, 6, 7:
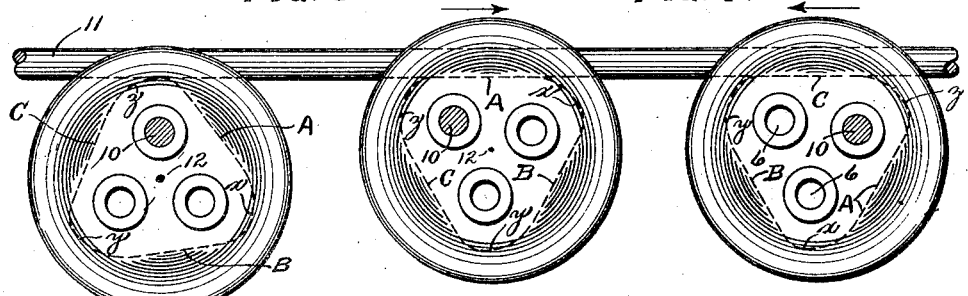
Fig. 5 is a view of my invention showing its relation to the current conductor or trolley wire when the vehicle is moving in the forward direction, as indicated by the arrow.
Fig. 6 shows the relation of my invention to the trolley wire when the vehicle is moving backward, as indicated by the arrow.
Fig. 7 shows the relation which my invention will assume with relation to the trolley wire or conductor at or just before it is placed in engagement with the conductor, or it may assume different relation under some conditions when at rest and in contact with the trolley conductor.

In order to secure my invention to the harp I provide three transverse apertures 6. In Figs. 1 and 3 I have shown in each aperture a bushing 7 which may be made of anti-friction material if so desired, such bushings being common with the rotating current collector, but this bushing is not necessary as the relative movement of my collector with reference to its support is very limited, therefore, in the other figures the construction shown is without the bushing 7. These transverse openings are formed in the web 8 from which projects the flanges 9 thereby forming a sufficiently long transverse aperture 6 to properly support the device. Through any one of these apertures may be positioned a supporting pin 10, the ends of which are secured in the trolley harp, as is well known, and about which pin the device may pivot, as shown in Figs. 5, 6 and 7. In order to prevent the possibility of complete rotation of my invention when in service, and to secure the yielding relation between it and the trolley conductor, as already described, I make use of the three apertures 6 and position them between the adjacent ends of the flat portions A, B and C and usually the center 4 of the radius of the arc D is also the center of the axis of the apertures 6. This permits a free and easy pivotal action of the collector with respect to its pivot when the adjacent surface $x$, $y$ or $z$ engages the conductor and the device starts to move forward or backward. It will be evident, however, that the specific construction described in regard to my invention is not necessary in order to make it successfully operable.

Referring to Figs. 5, 6 and 7, the trolley conductor is designated as the element 11. My invention is presumed to be mounted in any standard trolley harp by means of the pin 10. Assuming this to be the condition, it will be evident that the collecting shoe being pivoted off center that the pivotal point is not at its center of gravity and, therefore it is not in equilibrium and hence it is heavier at one portion than the other and this condition is represented in Fig. 7, showing the position which the device will take when not in contact with the trolley conductor or when first placed in contact with the trolley conductor. The overbalanced condition of the device will cause it to normally assume the position shown in Fig. 7 whether it is moving forward or backward while engaging the trolley conductor 11 and when released from the trolley conductor it will assume the position shown in Fig. 7.

If now it is assumed that the device in contact with the trolley conductor has the position as shown by Fig. 7 and the vehicle starts to move forward as shown by the arrow in Fig. 5, the device will assume the position relative to the trolley conductor, as shown in Fig. 5, due to the conductor engaging the circular surfaces E, and free to rotate about the pin 10. The upward pressure on the collecting shoe will cause sufficient friction between the surface z and the trolley conductor 11 to overcome the displaced condition in a displaced center of gravity. In Fig. 5 the contact surface A engages the conductor and the advance end of the surface A will be the first to meet any obstruction along the conductor and the tendency will be for the advance end of the surface A to rotate downwardly about the axis of the pin 10 thereby permitting the trailing end of the surface A to remain in engagement with the conductor at all times.

If the direction of motion of the vehicle should be reversed so as to take that shown by the arrow in Fig. 6, the current collector would immediately pivot about the pin 10 and assume the position shown in Fig. 6 with relation to the conductor 11. Here we have the surface C in engagement with the trolley conductor in place of the surface A, but the advance end of the surface A is still free to pivot about the pin 10 if the collector meets an obstruction. If now the vehicle should have its direction of motion reversed the collector would again assume the position shown in Fig. 5, and should the collector be withdrawn from the conductor it would assume the position shown in Fig. 7. It is evident that the pin 10 may be positioned in any of the three apertures as desired, and that the surfaces which will come into contact with the current collector will be those two surfaces between which the pin 10 is pivoted. From this it will be seen that the distribution of wear can be distributed over the three surfaces shown and that the surface which may occasionally be used when the vehicle is backing can be brought into use as the forward moving surface by reversing the collector in the harp.

It will be observed that the construction of the device is symmetrical with respect to the center 12 and which is the center of gravity as the collector would rotate freely about this point if pivoted there, but would not make a practical device. The point 12 will normally hang below the active pivotal point 6 when the device is mounted and free from the conductor.

Having described my invention,
I claim:—

1. A current collector comprising a body member having a plurality of flat wire-engaging surfaces connected at their extremities by curved surfaces and having a plurality of fixed means to receive a support about which the collector can pivot so as to present either one of two predetermined flat surfaces to a wire and depending upon the direction of motion of the collector relative to the wire the number of flat wire-engaging faces and the number of fixed means being equal.

2. A current collector comprising a body member having a plurality of flat wire-engaging surfaces connected at their extremities by curved surfaces and having a plurality of fixed means equal in number to the flat wire-engaging surfaces to receive a support about which the collector may pivot, circumferential flanges positioned on each side of the flat and curved surfaces to form grooves therewith to prevent the collector leaving the wire laterally.

3. A current collector comprising a body member having a plurality of flat wire-engaging surfaces and an equal number of curved surfaces connecting the extremities thereof, circumferential flanges on each side of said surfaces to form a groove therewith to prevent lateral displacement of the collector, the flat faces so related that if extended to meet each other they will form a triangle, and a means to receive a support for said collector, said support means being placed between two of the flat surfaces and adjacent the curved surface connecting the same about which the collector may pivot to present one or the other of said surfaces to the wire, depending upon the direction of motion of the collector relative to the wire.

4. A current collector comprising a body member having a plurality of flat wire-engaging surfaces having their extremities connected by an equal number of curved surfaces, means on each side of the surfaces to prevent lateral displacement relative to a wire, a plurality of fixed supporting means equal to the number of flat surfaces about any one of which the collector may pivot to present the two adjacent flat surfaces to the wire as the collector moves forward or backward.

5. A current collector comprising a body member having a plurality of flat wire-engaging surfaces having their adjacent extremities connected by curved surfaces, means on each side of the surfaces to prevent lateral displacement relative to the wire, a plurality of supports equal in number to the flat wire-engaging surfaces, about any one of which the collector may pivot as predetermined, each support being removed from the center of gravity of the collector as a whole.

6. A current collector comprising a body member having a plurality of flat wire-engaging surfaces and having their adjacent extremities connected by curved surfaces and having means to prevent lateral displacement relative to the wire, a plurality of supports equal in number to the flat wire-engaging surfaces, about any one of which the collector may pivot as predetermined and each support so placed that the center of gravity is removed from the axis of pivotal movement for the purpose described.

7. A current collector comprising a body member having a plurality of wire-engaging surfaces and a plurality of fixed supports equal in number to the wire-engaging surfaces about any one of which as predetermined the collector may pivot as a whole, depending upon the direction of motion of the collector relative to the wire.

8. A current collector comprising a body member having a wire-engaging groove and a plurality of fixed supporting means about the axis of any one of which the collector may pivot, the pivotal axis of each supporting means being equally spaced from the pivotal axis of each of the other pivotal axes.

9. A current collector comprising a body member having a circumferential groove provided with three symmetrically disposed flat wire-engaging surfaces, three fixed supporting means symmetrically disposed with respect to the three flat surfaces and the center of gravity of the device.

10. A current collector substantially circular and uniformly disposed about an axis passing through the center of gravity and having three flat wire-engaging surfaces symmetrically disposed with respect to the center of gravity, and a pivotal mounting for each pair of flat surfaces to support the collector in a trolley harp so that either of the two surfaces corresponding to any one pivotal mounting may be brought into engagement with the trolley wire.

11. A current collector substantially circular in shape and provided with a groove having three flat wire-engaging surfaces having their adjacent ends connected by arc shaped wire engaging surfaces, means for pivotally mounting the collector with respect to any two surfaces such that said two surfaces may be brought into engagement with the trolley wire, depending upon the direction of movement of the collector relative to the wire.

12. A current collector comprising a body member having three straight wire-engaging grooved surfaces, a plurality of pivotal mounting means, each means so placed with respect to the said surfaces that each means provides an unbalanced condition when acting as the pivotal means tending to move the said surface away from the wire about the axis of said acting pivotal means.

13. A current collector comprising a groove provided with three flat wire-engaging surfaces, and means to so pivotally mount the collector that any two of the surfaces desired may be brought into operable relation with the wire, depending upon the direction of movement of the collector relative to the wire.

14. A current collector having a groove provided with a plurality of flat wire-engaging surfaces and a plurality of pivotal mounting means equal in number to the wire-engaging surfaces all parts of the collector symmetrically disposed relative to each other and to the center of gravity of the device, the pivotally mounting means being spaced from each other and from the center of gravity and when acting as the active pivotal axis the device is unbalanced with the center of gravity, biased to move to a position below the pivotal axis.

15. A current collector comprising a body member having a flanged groove provided with a plurality of wire-engaging surfaces and the periphery of the flanges being circular and a plurality of fixed supporting means about the axis of any one of which the collector may pivot.

16. A current collector comprising a body member having a plurality of wire-engaging surfaces angularly disposed relative to each other not to exceed 90°, flanges forming a part of said collector to prevent displacement relative to a conductor and supporting means positioned between the surfaces adjacent the point of least divergency.

17. A current collector comprising a body member having two wire-engaging surfaces angularly disposed to each other at not more than 90° and connected at their point of least divergency by an arc shaped wire-engaging surface and supporting means positioned between the said two surfaces adjacent the point of least divergency.

In testimony whereof I affix my signature.

HOMER P. CHANDLER.